United States Patent
Ko et al.

(10) Patent No.: US 10,460,846 B2
(45) Date of Patent: Oct. 29, 2019

(54) EXAMINATION AND TEST SYSTEM FOR NUCLEAR-GRADE CONTROL VALVE

(71) Applicant: INSTITUTE OF NUCLEAR ENERGY RESEARCH, ATOMIC ENERGY COUNCIL, EXECUTIVE YUAN, Taoyuan (TW)

(72) Inventors: Hsueh-Chao Ko, Taoyuan (TW); Chii-Neng Ou Yang, Taoyuan (TW); Yao-Min Lee, Taoyuan (TW); Cheng-Jung Yu, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 505 days.

(21) Appl. No.: 15/275,678

(22) Filed: Sep. 26, 2016

(65) Prior Publication Data
US 2018/0090235 A1    Mar. 29, 2018

(51) Int. Cl.
| | | |
|---|---|---|
| *G21C 17/00* | (2006.01) | |
| *F16K 1/00* | (2006.01) | |
| *F16K 31/126* | (2006.01) | |
| *F16K 37/00* | (2006.01) | |

(52) U.S. Cl.
CPC ............. *G21C 17/00* (2013.01); *F16K 1/00* (2013.01); *F16K 31/1262* (2013.01); *F16K 37/0008* (2013.01); *F16K 37/0016* (2013.01); *F16K 37/0083* (2013.01)

(58) Field of Classification Search
CPC ....... G21C 17/00; F16K 1/00; F16K 31/1262; F16K 37/0008; F16K 37/370016; F16K 37/0083
See application file for complete search history.

(56) References Cited

U.S. PATENT DOCUMENTS

| | | | | |
|---|---|---|---|---|
| 2,708,563 | A * | 5/1955 | Backman | F16K 1/00 251/215 |
| 4,406,303 | A * | 9/1983 | Kilmoyer | F16K 37/0008 137/552 |
| 7,032,878 | B2 * | 4/2006 | Coura | F16K 31/003 137/554 |
| 2015/0226580 | A1 * | 8/2015 | Dequarti | F16K 37/0008 324/207.25 |

* cited by examiner

*Primary Examiner* — Marshall P O'Connor
(74) *Attorney, Agent, or Firm* — Rosenberg, Klein & Lee

(57) ABSTRACT

An examination and test system for nuclear-grade control valve is provided and includes a hermetic first chamber, a base, a guide unit, a winder, a steel cable, and a length measurement device. The hermetic first chamber includes a second chamber for accommodating a control valve. The base is disposed outside the hermetic first chamber. The guide unit is disposed on at least one of the control valve and the base. The winder and the length measurement device are disposed on the base. The steel cable connects with a valve rod of the control valve and extends out of the hermetic first chamber to connect with the winder. The steel cable is wound on the guide unit, wound up by the winder, and thus rendered taut at any time. The length measurement device has a measurement element coupled to the steel cable and displays the displacement of the measurement element.

8 Claims, 4 Drawing Sheets

EXAMINATION AND TEST SYSTEM FOR NUCLEAR-GRADE CONTROL VALVE

FIELD OF THE INVENTION

The present invention relates to an examination and test system for nuclear-grade control valve, which is used for providing a high-temperature, high-pressure, and high-humidity environment emulating the one when an accident occurs in a nuclear power plant and examining if a control valve is able to operate normally in an environment of accident.

BACKGROUND OF THE INVENTION

Pipes are disposed in nuclear plants for conveying working fluids such as high-temperature and high-pressure fluids, high-temperature vapors, or cooling water. The pipes uses control valves to control the flow rate and pressure of conveying working fluids.

Please refer to FIG. 1A, which shows a cross-sectional view of the structure of a control valve 100. The control valve 100 comprises a valve base 110, a valve rod 120, and a driving unit 130. The valve base includes a cavity 112, which includes a communicating opening 111. The cavity 112 is used for connecting a plurality of pipes. The control valve shown in FIG. 1A can connect two pipes. A valve plug 121 is disposed at one end of the valve rod 120, which can be moved by the driving unit 130 and thus enabling the valve plug 121 to close or open the communication opening 111. As shown in FIG. 1A, the valve plug 121 closes the communication opening 111 and hence interrupts flowing of fluids between the two pipes. As shown in FIG. 1B, the valve plug 121 is away from the communicating opening 111 and thus opening the communicating opening 111. Then, fluids can flow between the two pipes. The location of the valve plug 121 relative to the communicating opening 111 can be adjusted according to the traveling distance of the valve rod 121. By controlling the openness of the communicating opening 111, the flow rate of working fluids can be controlled accordingly. The valve rod 120 includes an indicator 123. A scale 124 is disposed on the fixing frame located at the bottom of the housing 131. The scale 124 corresponds to the traveling distance of the indicator 123. Thereby, an observer can acquire the displacement of the valve rod 120 according to the reading of the indicator over the scale 124.

Components for nuclear plants must be examined and tested for determining if they comply with the regulations for nuclear-grade components. In addition to executing functions normally and safely under normal conditions, it should be guaranteed that the functions could be executed safety when external accidents or natural disasters happen. Specifically, the operations of control valves influence the conveyance of working fluids in the pipes of nuclear plants. They are not only related to the efficiency of power generation but also to the safety of nuclear plants. To elaborate, control valves need to operate normally when serious accidents, such as earthquakes or explosions, occur in nuclear plants. In addition, with equal importance, they should be able to operate normally after accidents. This is because the pipes may break after serious accidents. The control valves in various pipes must close or open correspondingly for controlling the working fluids to stop conveying or change directions of conveyance.

Accordingly, before control valves are installed to nuclear plants, they must be examined and tested in an environment emulating accidents. Hence, whether the control valves comply with the quality and safety regulations for nuclear-grade components can be guaranteed.

In an examination and test system for control valve according to the prior art, high-temperature and high-pressure liquids are sprayed to a hermetic first chamber to form a transient high-temperature, high-pressure, and high-humidity environment inside the first chamber with a maximum pressure of 7~10 kgw/cm2 and a maximum temperature of 200 degrees, and form a high-temperature and high-pressure environment with gradually decreasing temperature and pressure for emulating the environment inside a nuclear power plant when accidents, such as pipe breakage, explosion, or radiation leak, occur. The control valve is disposed inside the hermetic first chamber for enduring the high-temperature, high-pressure, and high-humidity transients. Then records and observations are performed for specific intervals at specific pressures and temperatures, to see if the control valve operates normally.

Nonetheless, in the high-temperature, high-pressure, and high-humidity transients, it is not possible for observers to enter the hermetic first chamber. They cannot observe and record the operational processes of the control valve promptly until the temperature, pressure, and humidity inside the hermetic first chamber decreases to the range where human bodies or equipment can endure.

Accordingly, the examination and test system for control valve according to the prior art has the drawback of inability in observing control valve promptly in high-temperature, high-pressure, and high-humidity transients. In addition, when an observer needs to observe and record, he needs to put on special apparels before entering the hermetic first chamber, which results in inconvenience in operations.

SUMMARY

An objective of the present invention is to disclose an examination and test system for nuclear-grade control valve, which makes the examination and test process more convenient and safer. In addition, observation and recording of operations of control valves in transients and later stages can be performed completely.

In order to achieve the above objective and other purposes, the present invention discloses an examination and test system for nuclear-grade control valve used for examining and testing a control valve. The control valve comprises a valve base, a valve rod, and a driving unit. The valve base includes a communicating opening therein. The valve rod includes a valve plug capable of closing the communication opening. The valve rod can be moved by the driving unit. The valve plug can block the communicating opening and form openness of various degrees according to the traveling distance of the valve rod. The examination and test system for nuclear-grade control valve comprises a hermetic first chamber, a base, a guide unit, a winder, a steel cable, and a length measurement device. The hermetic first chamber includes a second chamber for accommodating a control valve. Ambient conditions within the second chamber, such as temperature, pressure and humidity, are controllable. The base is disposed outside the hermetic first chamber. The guide unit is disposed on at least one of the control valve and the base. The winder is disposed on the base. The steel cable connects with the valve rod and extends out of the hermetic first chamber to connect with the winder at the other end thereof. The steel cable is wound on the guide unit, wound up by the winder, and thus rendered taut at any time. The length measurement device is disposed on the base, and includes a body and a measurement element. The measurement element is movable with respect to the body and is coupled to the steel cable. The length measurement device displays the displacement of the measurement element relative to the body.

According to the examination and test system for nuclear-grade control valve as described above, the hermetic first chamber includes a hole on the sidewall. An elastic hermetical plug is plugged to the hole. The steel cable passes through the elastic hermetical plug and extends out of the hermetically sealed chamber.

According to the examination and test system for nuclear-grade control valve as described above, the elastic hermetically sealed plug is cone-shaped.

According to the examination and test system for nuclear-grade control valve as described above, the material of the elastic hermetically sealed plug is silica gel or rubber.

According to the examination and test system for nuclear-grade control valve as described above, the length measurement device is a dial gauge or a digital vernier caliper.

According to the examination and test system for nuclear-grade control valve as described above, the control valve includes a positioning member, which includes a feedback lever. The feedback lever includes a guiding hole. The valve rod includes a positioning pillar, which is disposed in the guiding hole. One end of the steel cable is fixed to the positioning pillar or the feedback lever.

According to the examination and test system for nuclear-grade control valve as described above, observers can observe and record the operations of control valves directly outside the hermetic first chamber. No matter in high-temperature and high-pressure transients, after some specific time interval, or at some specific pressure or temperature, the operations of control valves in various examination and test conditions can be observed promptly. Besides, observers can observe and record outside the hermetic first chamber. It is not required to enter the high-pressure and high-humidity hermetic first chamber. Accordingly, compared to the prior art, the examination and test system for control valve as described above can realize synchronous observation during the test process for acquiring complete data and results. It owns excellent repeatability and accuracy. It also makes examination and test processes more convenient and safer.

BRIEF DESCRIPTION OF THE DRAWINGS

FIG. 1A shows the close state of the control valve; FIG. 1B shows the open state of the control valve;

DETAILED DESCRIPTION

In order to make the structure and characteristics as well as the effectiveness of the present invention to be further understood and recognized, the detailed description of the present invention is provided as follows along with embodiments and accompanying figures.

Figure 1A:
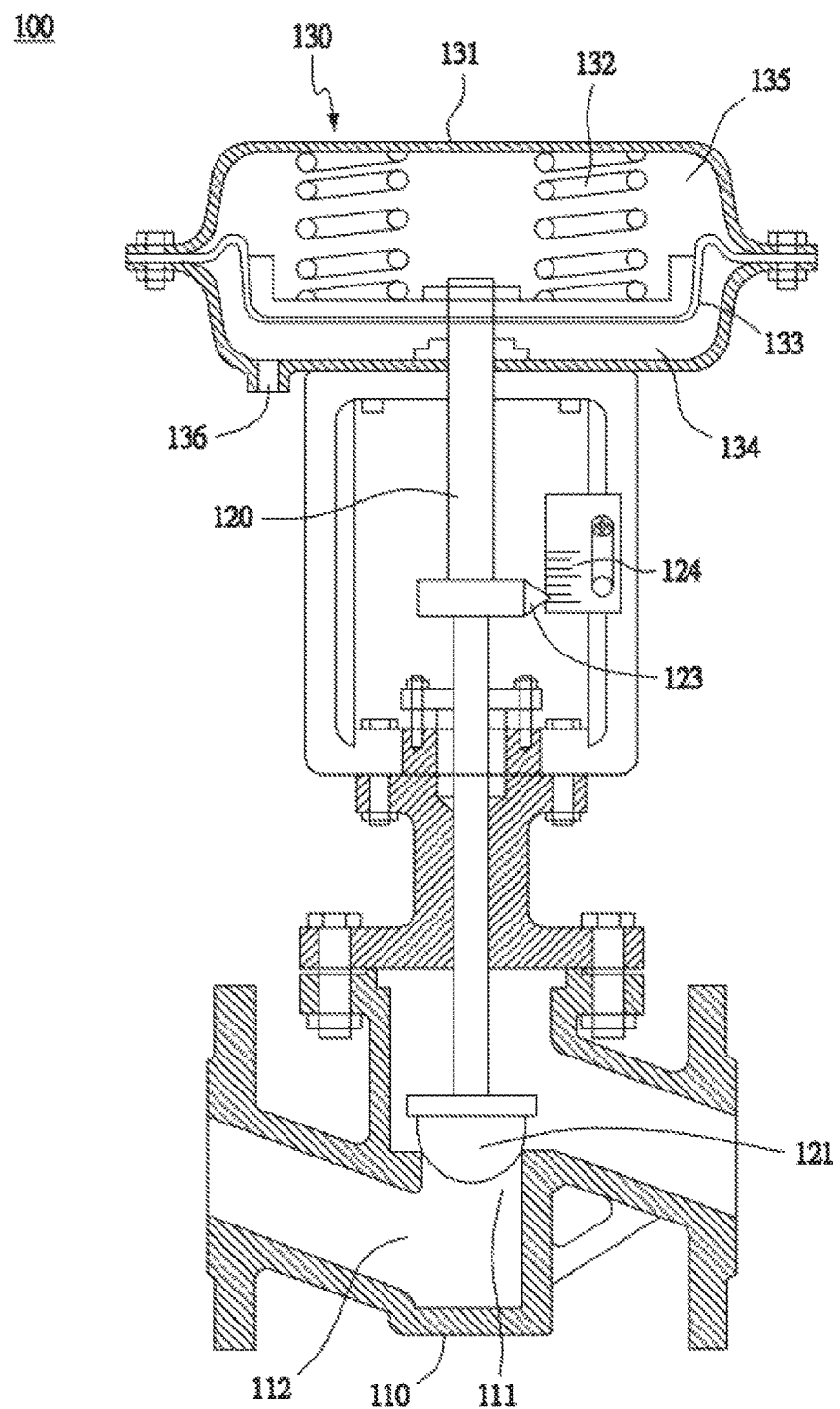
FIGS. 1A and 1B show schematic diagrams of the operations of the control valve according to the embodiment of the present invention.
Figure 1B:
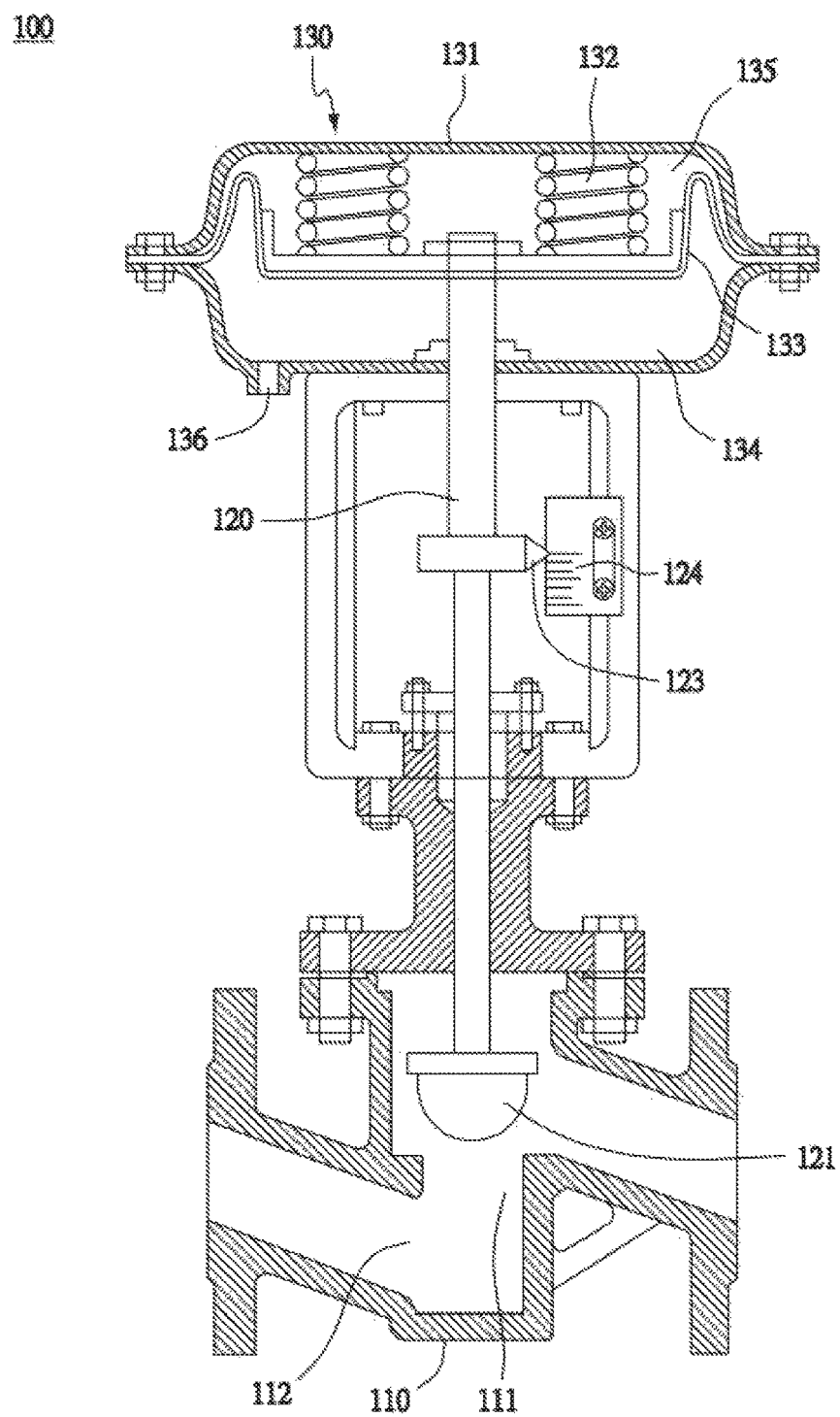

Please refer to FIGS. 1A and 1B. The examination and test system for nuclear-grade control valve according to the embodiment of the present invention is used for examining and testing a control valve 100. The control valve 100 comprises a valve base 110, a valve rod 120, and a driving unit 130. The valve base 110 includes a communicating opening 111 therein. The valve rod 120 includes a valve plug 121 capable of closing the communication opening 111. The valve rod 120 can be moved by the driving unit 130. The valve plug 121 can block the communicating opening 111 and form openness of various degrees according to the traveling distance of the valve rod 120.

The driving unit 130 includes a housing 131, a spring 132, and a membrane 133. The membrane 133 is disposed in the housing 131 and separates the housing 131 into an air zoom 134 and a spring zoom 135. In addition, the housing 131 includes an air inlet 136 communicating with the air zoom 134. The air inlet 136 is used for inputting air into the air zoom 134 for changing the internal pressure of the air zoom 134. The spring 132 is disposed in the spring zoom 135 with one end connected to the membrane 133. The top end of the valve rod 120 is coupled and fixed to the membrane 133. As air in put into the air zoom 134, the membrane 133 pushed the valve rod 120 and thus moving the valve rod 120. Consequently, the valve plug 121 can form openness of various degrees for the communicating opening 111.

Figure 2:
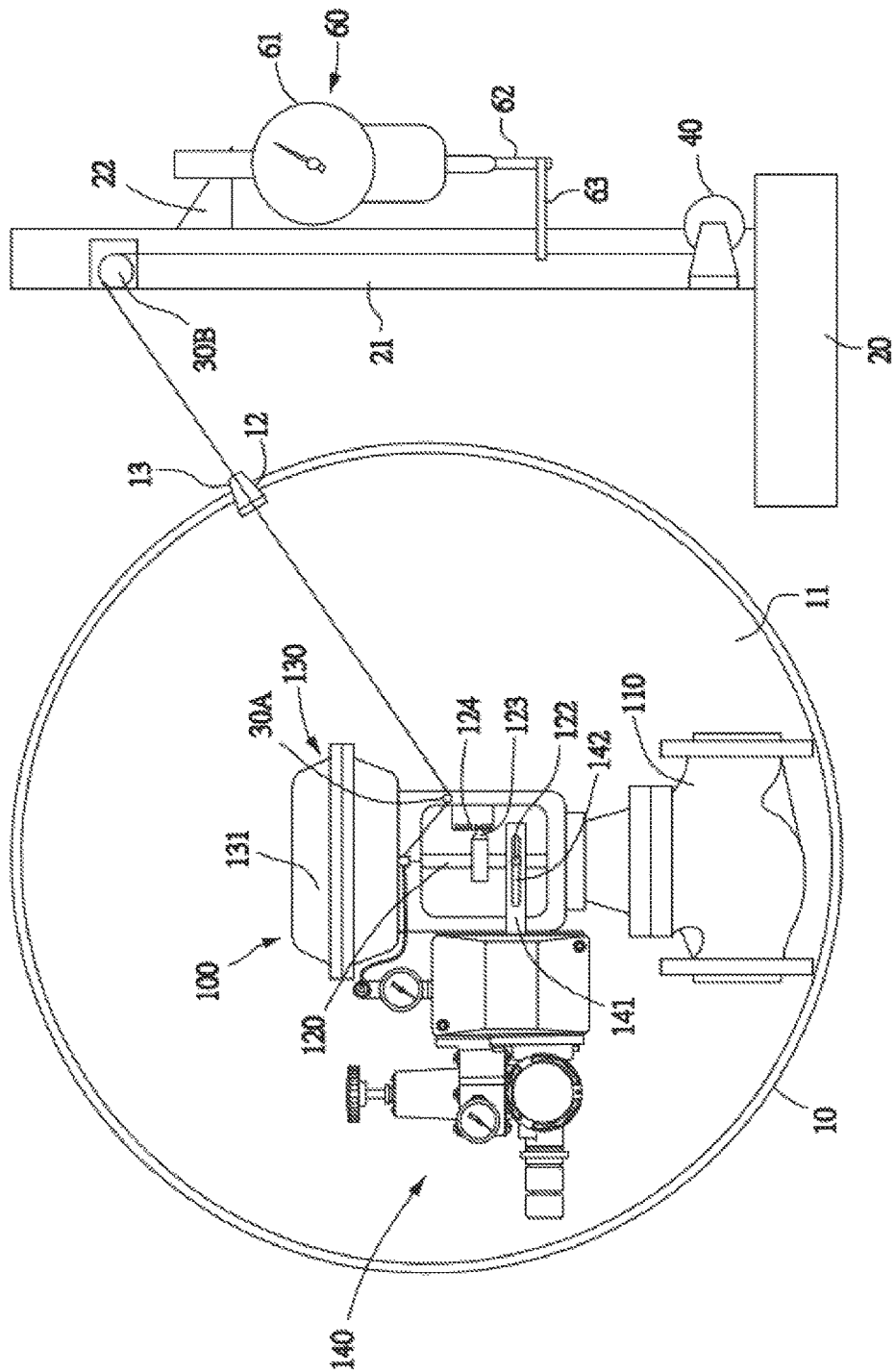
FIG. 2 shows a schematic diagram of the examination and test system for nuclear-grade control valve according to the embodiment of the present invention.

Please refer to FIG. 2. The examination and test system for nuclear-grade control valve comprises a hermetic first chamber 10, a base 20, a guide unit, a winder 40, a steel cable 50, and a length measurement device 60. The hermetic first chamber 10 includes a second chamber 11 for accommodating a control valve 100. Ambient conditions within the chamber, including one or more of temperature, pressure and humidity inside the hermetic first chamber 10, are controllable. The base 20 is disposed outside the hermetic first chamber 10. The guide unit is disposed on at least one of the control valve 100 and the base 20. The winder 40 is disposed on the base 20. The steel cable 50 connects with the valve rod 120 at one end and extends out of the hermetic first chamber 10 to connect with the winder 40 at the other end thereof. The steel cable 50 is wound on the guide unit, wound up by the winder 40, and thus rendered taut at any time. The length measurement device 60 is disposed on the base 20, and includes a body 61 and a measurement element 62. The measurement element 62 is movable with respect to the body 61 and is coupled to the steel cable 50. The length measurement device 60 is used for displaying the displacement of the measurement element 62 relative to the body 61.

As shown in the figure, the measurement element 62 can be coupled to the steel cable 50 through a fixing member 63. Both end of the fixing member 63 are fixed to the measurement element 62 and the steel cable 50, respectively. When the steel cable 50 is moved as a result of the movement of the valve rod 120 of the control valve 100, the measurement element 62 is driven to displace. Then, the displacement of the measurement element 62 can be given by the length measurement device 60. For example, the body 61 includes a display for displaying the displacement. Thereby, the displacement and the relative position of the valve rod 120 of the control valve 100 will be known, and hence giving the openness of the control valve 100. Moreover, the length measurement device 60 can be, for example, a dial gauge or a digital vernier caliper.

The hermetic first chamber 10 can be, for example, a thermal aging oven or a pressure chamber. It includes a second chamber 11 with controllable at least one of the internal temperature, pressure, and humidity for emulating the environment inside a nuclear power plant when accidents, such as pipe breakage, explosion, or radiation leak, occur. For example, high-temperature and high-pressure liquids or gas are introduced into the hermetic first chamber 10 via pipes to form a transient high-temperature, high-pressure, and high-humidity environment and the later stage with gradually decreasing temperature and pressure. The transient temperature and pressure reach the maximum, reaching, for example, a pressure of 7~10 kgw/cm2 and a temperature of approximately 200 degrees. The subsequent stage of decreasing temperature and pressure continues for 3 to 4 hours approximately.

Figure 3:
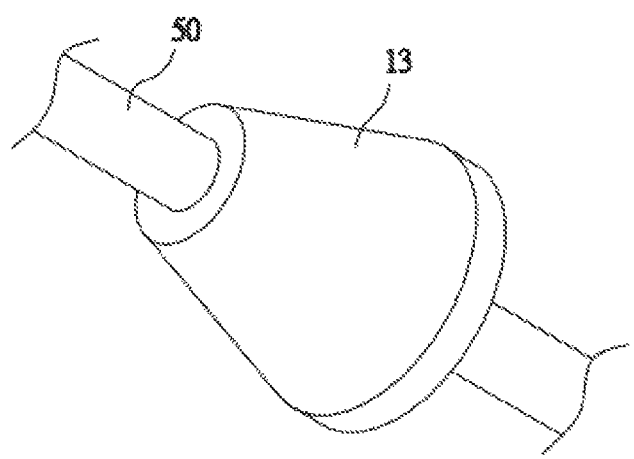
FIG. 3 shows a schematic diagram of the elastic hermetical plug according to the embodiment of the present invention.

The hermetic first chamber 10 includes a hole 12 on the sidewall. An elastic hermetical plug 13 is plugged to the hole 12. The steel cable 50 passes through the elastic hermetical plug 13 and extends out of the hermetic first chamber 10. As shown in FIG. 3, the elastic hermetically sealed plug 13 is cone-shaped with a gradually increasing width. The maximum width at the bottom is greater than the diameter of the hole 12. The end of the elastic hermetical plug 13 having a smaller width is plugged into the hole 12 from the second chamber 11 of the hermetic first chamber 10. Because the width of the elastic hermetical plug 13 increases gradually in the direction towards the second chamber 11, as the pressure inside the second chamber 11 of the hermetic first chamber 10 increases, the elastic hermetical plug 13 will be plugged more tightly into the hole 12 owing to the pressure, instead of being pushed out of the hole 12. Furthermore, the material of the elastic hermetically sealed plug is silica gel or rubber.

According to the present embodiment, the base 20 is disposed outside the hermetic first chamber 10 and used for carrying the winder 40 and the length measurement device 60. For example, the base 20 includes a frame 21 and a fixing base 22. The frame 21 is disposed vertically. The fixing base 22 is installed movably on the frame 21 for hanging or fixing the length measurement device 60.

According to the present embodiment, the guide unit includes two guide wheels 30A, 30B for forming the path of guiding the steel cable 50. As shown in the figure, the guide wheel 30A is disposed below the housing 131 of the driving unit 130 of the control valve 100 and aligns with the starting point where the steel cable 50 is fixed, making the steel cable 50 be supported and pulled straight. The steel cable 50 then passes through the hermetic first chamber 10 and to the outside. It goes along the guide wheel 30B disposed on the frame 21 of the base 20 and connects downwards to the winder 40. According to the present embodiment and figure, the number and the disposition locations of the guide wheels 30A, 30B in the guide unit and the wiring of the steel cable 50 are not limited to the example. Once the steel cable 50 is movedly linked with the valve rod 120 and not hindering the operations of the other components, it is within the scope of the claims of the present invention.

The control valve 100 can further includes a positioning member 140, which includes a feedback lever 141. The feedback lever 141 includes a guiding hole 142. The valve rod 120 includes a positioning pillar 122, which is disposed in the guiding hole 142. One end of the steel cable 50 is fixed to the positioning pillar 122 or the feedback lever 141. The main function of the positioning member 140 is to reduce the propagation delay of the adjusting signal by making use of the principle of torque balance, accelerate the moving speed of the valve rod 120, increasing the operational linearity of the valve, overcoming the friction of the valve rod 120, and eliminating the influence of imbalanced force caused by the variation of fluid pressure. Thereby, the valve rod 120 can be maintained at the assigned location accurately, and rapid and accurate positioning of the control valve 100 can be guaranteed.

According to the examination and test system for nuclear-grade control valve, observers can observe and record the operations of control valves directly outside the hermetic first chamber. No matter in high-temperature and high-pressure transients, after some specific time interval, or at some specific pressure or temperature, the operations of control valves in various examination and test conditions can be observed promptly. Besides, even the control valve is situated in the environment of high-temperature, high-pressure, and high-humidity not approachable by humans for various examinations and tests, observers still can observe and record outside the hermetic first chamber. It is not required to enter the high-pressure and high-humidity hermetic first chamber.

Consequently, compared to the prior art, the examination and test system for control valve as described above can realize synchronous observation during the test process for acquiring complete data and results. It owns excellent repeatability and accuracy. It also makes examination and test processes more convenient and safer.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. An examination and test system for nuclear-grade control valve, used for examining and testing a control valve, said control valve comprising a valve base, a valve rod, and a driving unit, said valve base including a communicating opening therein, said valve rod including a valve plug capable of closing said communication opening, said valve rod being movable by said driving unit, said valve plug blocking said communicating opening and forming openness of various degrees according to the traveling distance of said valve rod, the examination and test system comprising:
   a hermetic first chamber, including a second chamber with controllable ambient conditions including at least one of temperature, pressure and humidity, and said second chamber used for accommodating said control valve;
   a base, disposed outside said hermetic first chamber;
   a guide unit, disposed on at least one of said control valve and said base;
   a winder, disposed on said base;
   a steel cable, connected with said valve rod at one end and extending out of said hermetic first chamber to connect with said winder at the other end, wound on said guide unit, wound up by said winder, and rendered taut at any time; and
   a length measurement device, disposed on said base, and including a body and a measurement element, said measurement element movable with respect to said body and coupled to said steel cable, and said length measurement device displaying the displacement of said measurement element relative to said body.

2. The examination and test system for nuclear-grade control valve of any of claims 1, wherein said length measurement device is a dial gauge or a digital vernier caliper.

3. The examination and test system for nuclear-grade control valve of claim 1, wherein said hermetic first chamber includes a hole on the sidewall; an elastic hermetical plug is plugged to said hole; and said steel cable passes through said elastic hermetical plug and extends out of said hermetically sealed chamber.

4. The examination and test system for nuclear-grade control valve of any of claims 3, wherein said length measurement device is a dial gauge or a digital vernier caliper.

5. The examination and test system for nuclear-grade control valve of claim 3, wherein said elastic hermetical plug is cone-shaped.

6. The examination and test system for nuclear-grade control valve of any of claims 5, wherein said length measurement device is a dial gauge or a digital vernier caliper.

7. The examination and test system for nuclear-grade control valve of claim 5, wherein the material of said elastic hermetical plug is silica gel or rubber.

8. The examination and test system for nuclear-grade control valve of any of claims 7, wherein said length measurement device is a dial gauge or a digital vernier caliper.

* * * * *